May 24, 1932. F. C. BIGGERT, JR 1,860,340
APPARATUS FOR FEEDING METAL TO SHEARING DEVICES
Filed Dec. 8, 1930 3 Sheets-Sheet 1
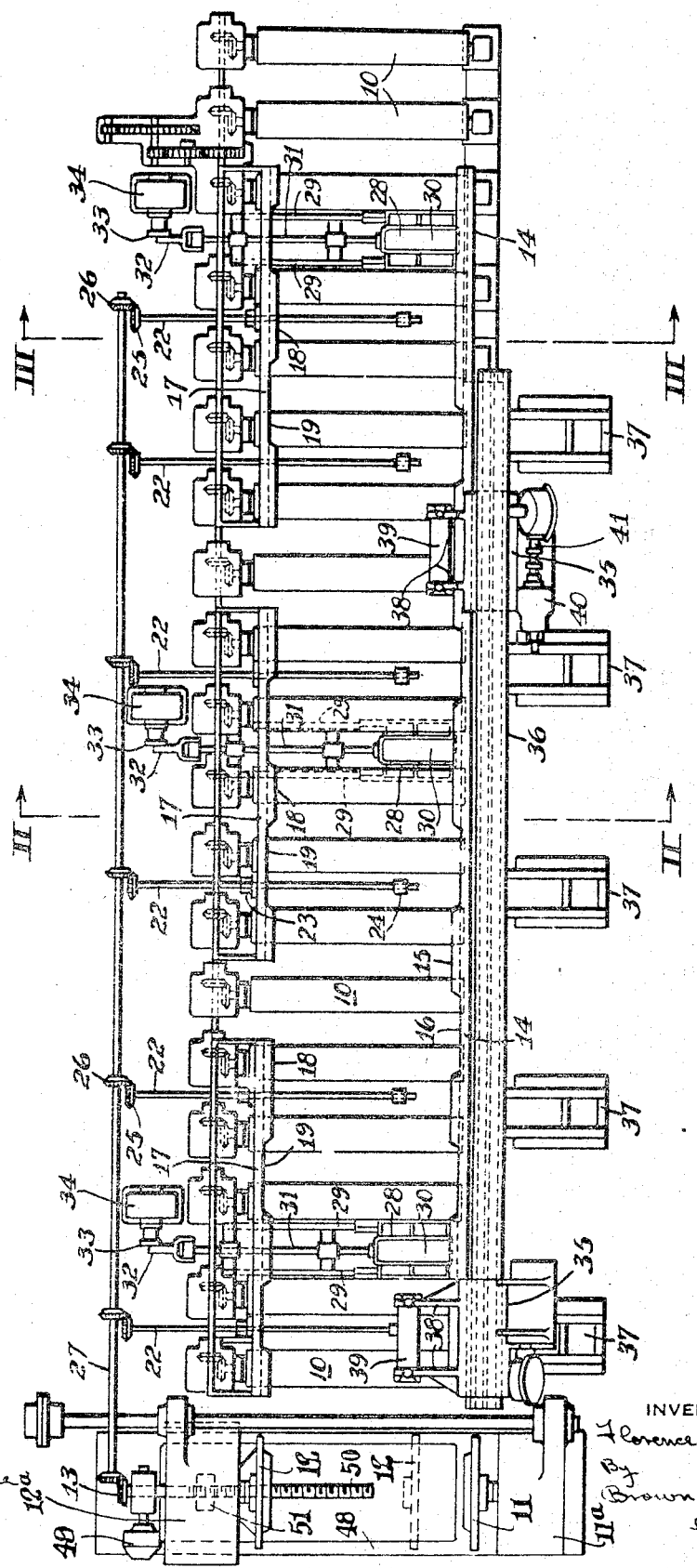

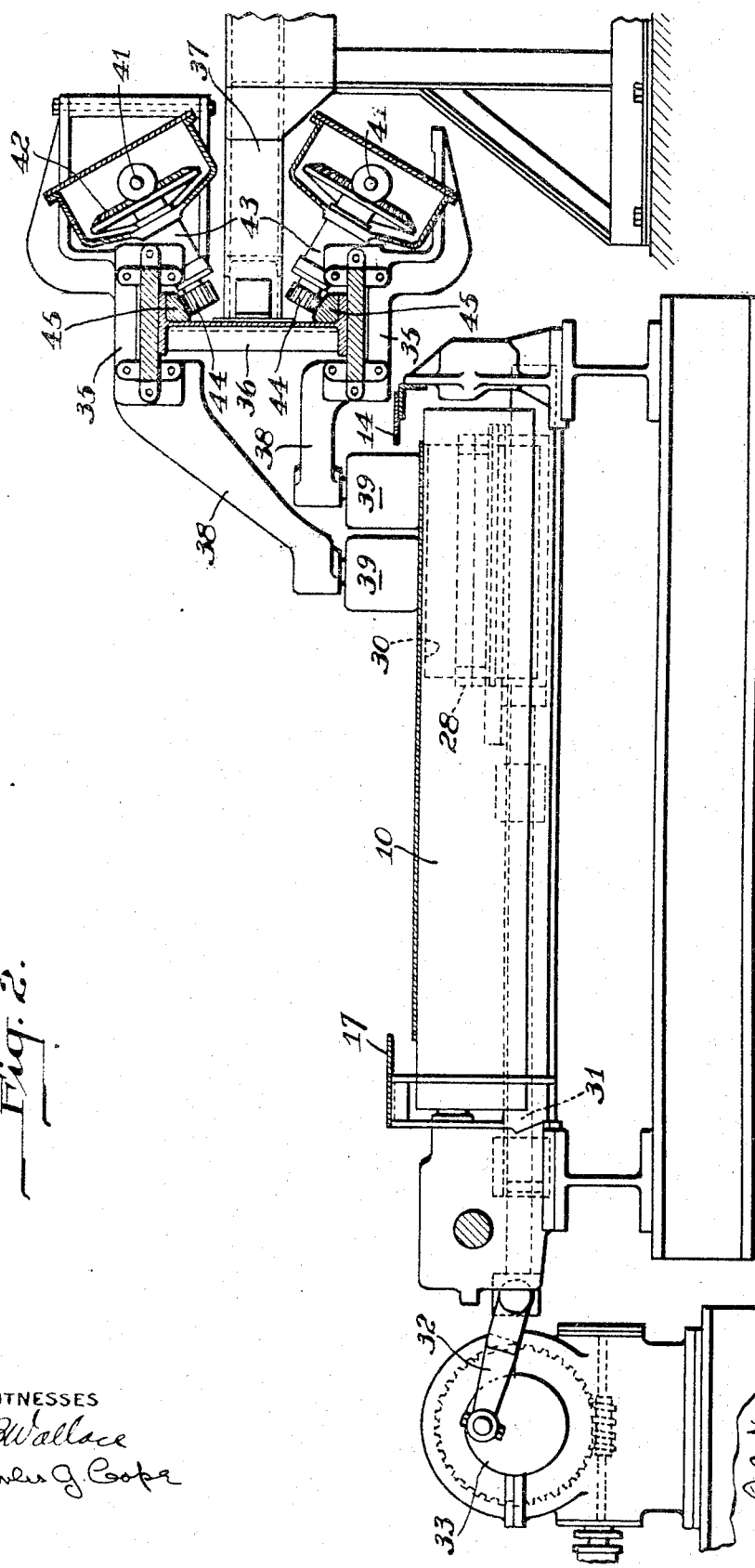

May 24, 1932. F. C. BIGGERT, JR 1,860,340
APPARATUS FOR FEEDING METAL TO SHEARING DEVICES
Filed Dec. 8, 1930 3 Sheets-Sheet 3
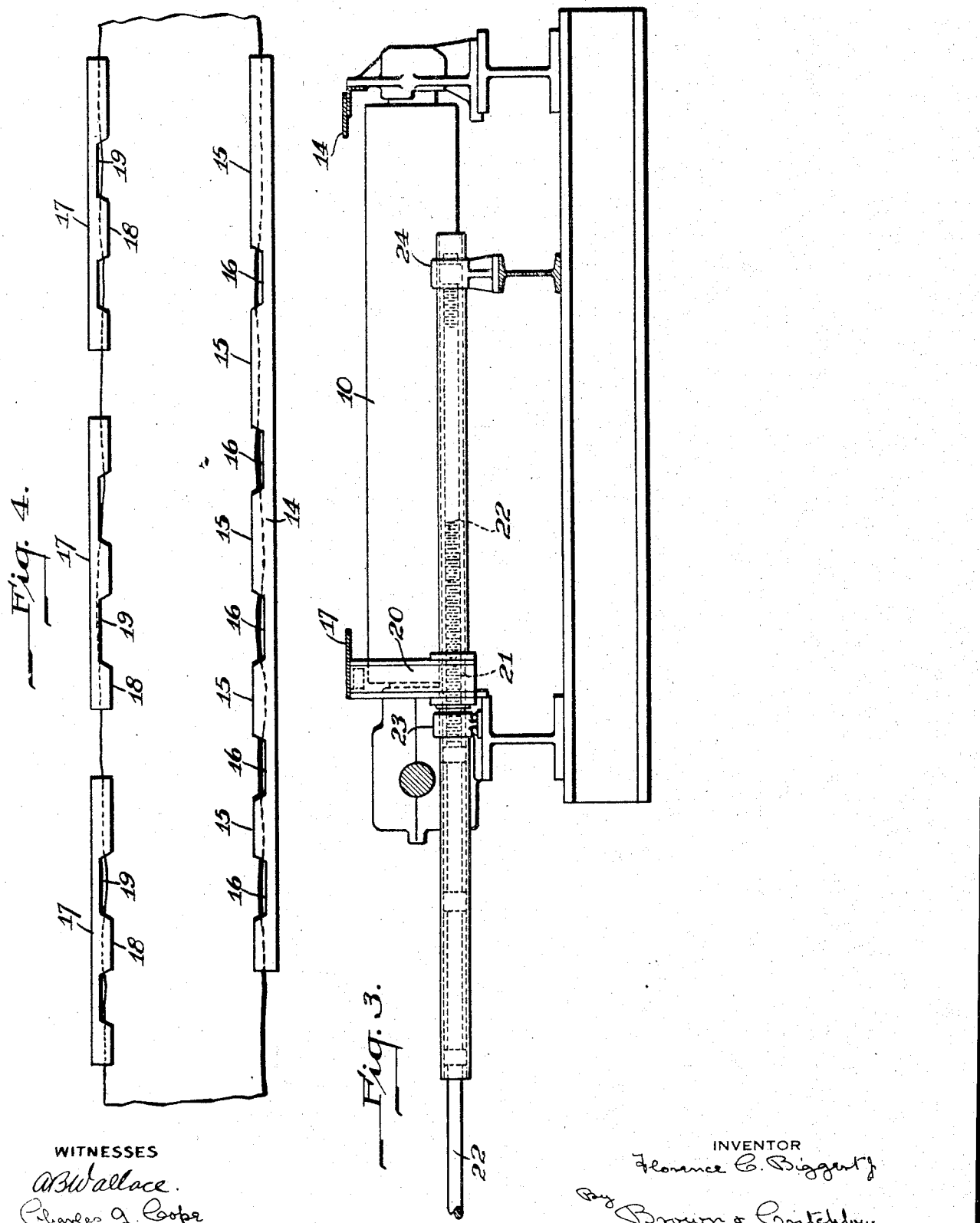
WITNESSES
INVENTOR Patented May 24, 1932

1,860,340

UNITED STATES PATENT OFFICE

FLORENCE C. BIGGERT, JR., OF CRAFTON, PENNSYLVANIA, ASSIGNOR TO UNITED ENGINEERING & FOUNDRY COMPANY, OF PITTSBURGH, PENNSYLVANIA, A CORPORATION OF PENNSYLVANIA

APPARATUS FOR FEEDING METAL TO SHEARING DEVICES

Application filed December 8, 1930. Serial No. 500,682.

My invention pertains to apparatus for use in feeding metal plates or sheets to shearing devices for trimming the edges thereof, and particularly to such apparatus for use in connection with rotary shears.

Metal plates or sheets, as produced by a rolling mill, commonly have the edges thereof somewhat irregular, the irregularity frequently taking the form of a camber, one longitudinal edge being convex, for instance, and the other concave. In order, therefore, to produce a sheet or plate of finished rectangular form, it becomes necessary to trim the edges thereof, this being frequently done by means of rotary shears, though other shearing devices are sometimes employed for the purpose. In order to reduce as much as possible the waste which results from trimming away the irregular edges it is desirable to line up the rough sheet accurately with the shearing apparatus,—i. e. with the rotary blades if rotary shears are employed. Inaccuracy of lining up the rough plate would result in the lines of cut of the shearing device running off the plate at such points as to produce an unnecessary waste of metal.

To meet the above-named conditions, one common practice has been for the operator to scribe or chalk a pair of parallel lines upon the rough plate to serve as guides for him in positioning the plate upon a roll table which is employed for feeding the plate forward to the shearing device. The plate having been positioned as closely as possible by the help of these lines, it is then seized by a clamping device, sometimes taking the form of an electro-magnet, which feeds it to the shearing apparatus. The clamping device travels on a rail, or is otherwise guided so as to move in a right line, with the object of insuring that the plate shall move forward in the alignment which has been selected. This and other commonly used means for aligning the plates with the shearing device and feeding them thereinto involves the expenditure of considerable time by the operator, with a corresponding slowing up of the operation of the mill. Moreover, it has sometimes been difficult to maintain, during feeding, such alignment as was secured by the operator in positioning the plate on the roll table.

It is an object of my invention to provide an apparatus for thus feeding plates or sheets to a shearing means, especially rotary shears, which will greatly decrease the loss of time which has heretofore accompanied the lining up of the rough plate. A further object is to provide an apparatus which will maintain with reliable accuracy the alignment of the plate with the shearing device during the feeding of the plate to the latter.

An apparatus constructed in accordance with my invention is described by way of example in the following specification and shown in the accompanying drawings. I wish it understood, however, that changes may be made in the apparatus shown and described, and that my invention may be embodied in other constructional forms, without exceeding the scope thereof as defined in the appended claims.

In the drawings:

Fig. 1 is a plan of a roller feed table for a rotary shears, with associated sight-gauges, plate adjusting means and plate feeding means constructed in accordance with my invention;

Fig. 2 is a section on the line 2—2 of Fig. 1, the magnetic feeding device seen at the left of Fig. 1 having, however, been moved to the right, so that both of the two feeding devices are seen in Fig. 2;

Fig. 3 is a section on the line 3—3 of Fig. 1 showing the means employed for moving the adjustable sight-gauges; and Fig. 4 is a schematic view showing the manner of adjusting the rough plate on the table with respect to the fixed and adjustable sight-gauges.

In Fig. 1 of the drawings there is shown a feed table including a plurality of driven rolls 10 which receive the rough plate after the same has been produced by the rolling mill, the plate usually coming to such feed table from some device for giving it a generally correct alignment, such as a skew roll table or the like. At one end of the feed table is located a supporting base 48 having fixedly secured thereto, at one end, a stand 11a in which is supported one pair of blades 11. Mounted for longitudinal sliding movement on the base is a second stand, 12a, for the other pair of blades 12. A motor 49, secured to the base, drives, through a worm and wheel connection or the like, a screw 50 which is threaded through a nut 51 secured to the stand 12a. Thus when the motor 49 is actuated the stand 12a will be caused to move from one position to another upon the base 48, adjusting the blades 12, for instance, from the position shown in full lines, adapted for trimming a relatively wide plate, to the position shown in dotted lines, adapted for trimming a relatively narrow plate.

My invention provides a simplified and rapid means for positioning the rough plate on the feed table so that it will enter the rotary shears in such a way as to have its edges trimmed with a minimum of waste, and, the plate having been thus aligned properly, for feeding it into the shears in such a manner as to maintain the alignment accurately during the feeding.

Suitably mounted upon the side framework of the feed table, and disposed so that there is room for the plate to pass beneath the same in entering upon the rolls of the feed table, is a fixed sight-gauge 14 having an outer edge 15 which is located so as to make alignment with the cutting edge of the fixed rotary shear blade 11. The fixed sight-gauge is formed with recesses 16, extending inward from the edge 15, for the purpose of enabling the location of the rough edge of the plate, with respect to the edge 15 of the fixed sight-gauge, to be observed.

At the side of the feed table opposite to the fixed sight-gauge there are provided a plurality of adjustable sight-gauges 17 having edges 18 and recesses 19 of a similar nature to the edges 15 and recesses 16 of the fixed sight-gauge. The adjustable sight-gauges 17 are shown as three in number and are made to move together, as one, in being adjusted. Each of the adjustable sight-gauges is carried by a pair of standards 20 (Fig. 3) having mounted therein nuts 21 which are threaded upon screws 22 mounted in bearings 23 and 24 so as to be disposed transversely of the feed table. The screws 22 have, at their outer ends, bevel pinions 25 which mesh with corresponding bevel pinions 26 upon a countershaft 27, which latter obtains its drive from a bevel pinion 13 mounted on the end of the screw 50 which effects the transverse adjustment of the adjustable rotary shear blades 12. The parts are originally set up in such manner that the edges 18 of the adjustable sight-gauges make alignment with the cutting edge of the adjustable rotary shear blades. This having been done, it is obvious that the alignment of the edges 18 with the cutting edge of the adjustable shear blades will be maintained throughout the adjustments of the latter.

For manipulating the rough plate upon the feed table, to position it properly thereon, I provide a plurality of plate shifting devices, which, in the form of apparatus illustrated, take the form of laterally movable electromagnets. Three of these are shown, one adjacent the middle and one adjacent each end of the feed table. Each shifting device (Figs. 1 and 2) comprises a magnet-casing 28, which is mounted on rails 29 so as to be slidable transversely of the feed table and contains an electro-magnet armature 30. The casing 28 has secured thereto a transversely extending rod 31 slidably mounted in suitable bearings, which rod is connected at its outer end with the pitman 32 of a crank disc 33 mounted upon the shaft of an electric motor 34. The arrangement is such that the crank normally occupies its dead center position, shown in Fig. 2, thereby giving the greatest movement of the electro-magnet for any given movement of the crank, and thus facilitating a delicate adjustment. The motors 34 and the magnets are separately controlled,—for instance, from a pulpit occupied by the operator,—so that one or more of the electromagnets may be energized and shifted at will. In the drawings, the electro-magnets are all shown as located adjacent the fixed sight-gauge, which would usually be the case when the rough plates are received from a skew roll table. However, they will be located as may be most convenient for the particular conditions encountered.

When the rough plate arrives upon the feed table, the operator stops the feed rolls 10 and thereupon operates one or more of the shifting magnets so as to position the plate properly. For instance, by operating the motor (34) shown towards the left of Fig. 1, the magnet being energized, he can shift the leading end of the plate towards one side or the other of the feed table. Or by operating two or more of the magnets he can shift the whole plate bodily. He manipulates the plate, by means of the magnets, until its edges are beyond the edges 15 and 18, respectively, of the fixed and adjustable sight-gauges. The plate then occupies a position such as is shown in Fig. 4. By means of the recesses 16 and 19 in the sight-gauges the operator is enabled readily to see when the edges of the rough plate are beyond the edges 15 and 18 of the sight-gauges, and, in fact, the operation of thus lining up the rough plate is capable of very easy and quick accomplishment. Since the edges 15 and 18 of the sight-gauges are in alignment with the cutting edges of the rotary shear blades 11 and 12, the edges of the plate will be trimmed true, providing that it is fed forward in such a manner as to maintain the alignment.

For feeding the plate forward to the shearing device, I employ two feeding devices which are capable of successive operation in what may be termed a "hand-over-hand" manner. Each of these feeding devices comprises a carriage 35 mounted to slide upon a beam 36 which is mounted upon suitable supports 37 at the side of the feed table adjacent the fixed sight-gauge. The carriages 35 are similar except that one rests upon the top of the beam 36 and the other is supported to slide against the bottom of such beam, and that the carriages are constructed so as to be capable of passing each other in their sliding movements. Each carriage has projecting therefrom an arm 38 from which an electro-magnet 39 is suspended in such a manner that its armature will be located in proximity to a plate resting upon the feed table. Each carriage has supported thereon a motor 40, upon the shaft 41 of which is a bevel pinion meshing with a bevel gear 42 secured to one end of a shaft which is mounted in an inclined bearing 43 forming part of the carriage. To the other end of the shaft is secured a pinion 44 meshing with a rack 45 carried by the beam 36.

When the operator has adjusted the rough plate into position with respect to the sight-gauges, as above described, he energizes the magnet of one of the feeding devices,—which feeding device may be located, at the time, at some distance back from the leading end of the plate,—and operates the motor of such feeding device. At the same time he may restart the feed rolls 10. The magnet of this feeding device will hold the plate in its aligned position while the plate is fed forward into the rotary shears for its rough edges to be removed. While one feeding device is operating in this manner, the motor of the other feeding device is operated to bring that feeding device back towards the trailing end of the plate. As the first feeding device approaches the shears, the magnet of the second feeding device is energized and the motor of such second feeding device is operated so as to cause such second feeding device to move with the plate, maintaining its alignment. After the second feeding device is thus in operation, the magnet of the first feeding device can be deenergized and the first feeding device brought back ready for another forward movement. In this way the feeding devices operate in a hand-over-hand manner, maintaining the alignment of the plate until its trailing end enters the rotary shears.

As will be seen, my invention makes it possible for an operator to adjust the rough plate into the most advantageous possible alignment with the shearing device with great ease and rapidity, and, furthermore, with an accuracy which obviates considerable waste which has heretofore characterized operations of this character. Furthermore, a reliable maintenance of the alignment of the plate, during feeding, is secured.

What I claim is:

1. The combination with a metal shearing device including a pair of shearing members for trimming opposed edges of a plate or sheet, one of said members being adjustable to accord with the width of the plate or sheet, and a feed table for said shearing device, of a pair of sight-gauges associated with said table for alignment with said shearing members, said sight-gauges being disposed above the level of the feed table to permit free movement of the metal beneath them and one of said sight-gauges being adjustable to accord with the adjustment of the adjustable shearing member.

2. The combination with a metal shearing device including a shearing member and a feed table for said shearing device, of a sight-gauge associated with said table and having an edge in alignment with said shearing member, said sight-gauge being disposed above the level of the feed table to permit free movement of the metal beneath the gauge and being formed with recesses extending rearwardly from said edge, for the purposes set forth.

3. The combination with a metal shearing device having an adjustable shearing member, and a feed table for such shearing device, of a sight-gauge associated with said table, means for adjusting said sight-gauge concurrently with the adjustment of said shearing member to accord therewith, and means for moving the metal upon said feed table into visual association with said sight-gauge.

4. The combination with a rotary metal shears, means for adjusting one of the blades thereof, and a feed table therefor, of a sight-gauge associated with said table, means cooperatively associated with the adjusting means for said shears table for adjusting said sight-gauge, and means for moving the metal upon said feed table into visual association with said sight-gauge.

5. The combination with a rotary metal shears comprising a fixed blade and an adjustable blade, and a feed table for said shears, of a sight-gauge having an edge in alignment with said fixed shears blade, a second sight-gauge having an edge in alignment with said adjustable shears blade, said sight-gauges being disposed above the level of the feed table to permit free movement of the metal beneath them, means for adjusting said second sight-gauge to accord with the adjustments of said adjustable shears blade, and means for moving the metal upon said feed table into visual association with said sight-gauges.

6. The combination with a metal shearing device and a feed table therefor, of a sight-gauge associated with said table, said sight-gauge being disposed above the level of the feed table to permit free movement of the metal beneath the gauge, an electro-magnet mounted for transverse movement with respect to said table, and means for actuating said magnet for moving the material on said feed table into visual association with said sight-gauge.

7. The combination with a metal shearing device and a feed table therefor, of a sight-gauge associated with said feed table and disposed above the same to permit entry of the metal therebeneath, and a plurality of spaced electro-magnets mounted for transverse movement with respect to the feed table, and means for independently actuating said magnets for moving the metal on said feed table into visual association with said sight-gauge.

8. The combination with a metal shearing device of means for maintaining the metal in alignment with said device as it enters the latter, said means comprising a pair of feeding devices, each adapted to seize the metal, means for individually moving each of said feeding devices with the metal as the latter enters said shearing device, and means for individually returning said feeding devices, said feeding devices being constructed to pass each other in their longitudinal movements, whereby said feeding devices can operate successively.

9. The combination with a metal shearing device and a feed table therefor, of means for maintaining the metal in alignment with said shearing device as it enters the latter, said means comprising guiding means extending longitudinally of said feed table, a pair of electro-magnets adapted, when energized, to seize the metal, said magnets being independently reciprocably mounted on said guiding means and being constructed and arranged to pass each other during their movements thereon, and individual motors, one for each electro-magnet, for imparting reciprocating movements thereto in either direction on said guiding means.

In testimony whereof, I sign my name.

FLORENCE C. BIGGERT, Jr.